Patented Mar. 16, 1937

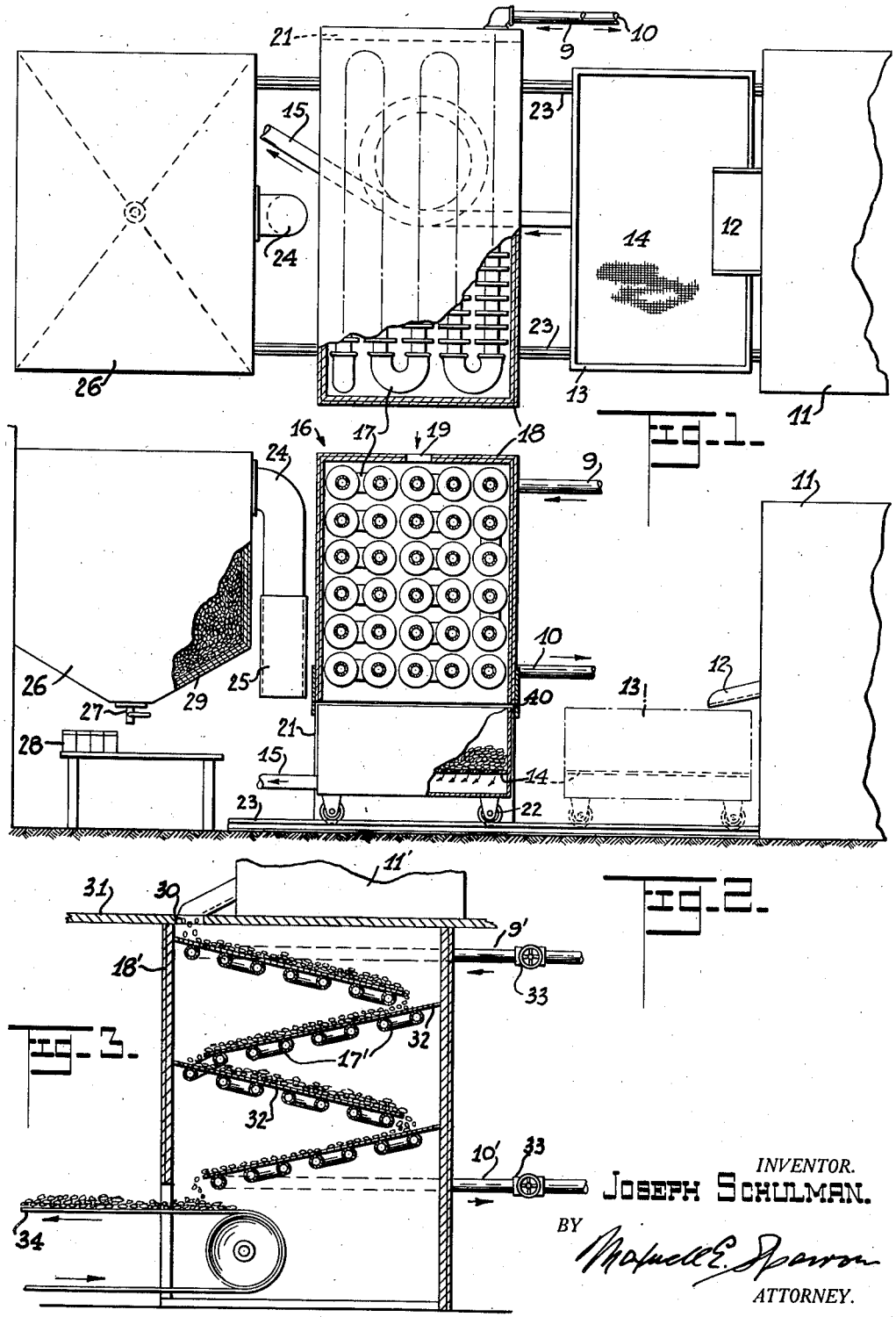

2,074,029

UNITED STATES PATENT OFFICE 2,074,029

METHOD AND MEANS FOR PREPARING FOODS AND THE LIKE WHICH REQUIRE ROASTING

Joseph Schulman, Brooklyn, N. Y.

Application July 11, 1932, Serial No. 621,946

2 Claims. (Cl. 34—21)

This invention relates to improvements in process and apparatus for preparing coffee and other food substances which require roasting in order to bring out their respective flavors.

Although the invention has general application to the preparation of food substances such as for example, coffee, cocoa, nuts, cereals, etc., which require roasting to bring out their respective flavors, by way of example and explanation, its application to coffee, to which it is particularly adapted, will be considered.

In present methods of preparing coffee for use, the coffee beans are roasted in a suitable apparatus and after attaining a certain desired color, are dumped hot into an apparatus known as a cooler box or pan which is generally fitted with a perforated false bottom. To cool the hot beans, a powerful air suction is applied underneath the box or pan, which draws air, (at room temperature), down into the mass of beans and exhausts it through a suitable outlet. The cooling operation usually takes approximately from eight to nine minutes, at the end of which time the beans are still quite warm. The cooler box or pan is then moved over to an apparatus called a stoner which is a pipe connected to an exhaust fan, the mouth of the pipe engaging the coffee beans, and the coffee beans being sucked up or lifted through the pipe into a hopper, leaving behind in the cooler box the heavier foreign substances. In some plants the coffee beans after being cooled are dumped upon a conveyor belt and the coffee beans, lifted by the stoner apparatus to a hopper.

The cooling operation is as important as the roasting operation for the reason that hot coffee beans just after leaving the roaster have a peculiar tendency to grow hotter in the open air from the intense chemical changes going on within them. It, therefore, becomes imperative to cool the coffee beans as quickly as possible to prevent uneven development, scorching and even actual fire, and for another important reason hereinafter stated.

The present known means for roasting the coffee may be considered as adequate, but in applying the existing cooling means, considerable of the flavor of the coffee is lost primarily due to the length of time it takes to cool the roasted coffee beans; the cooling means now used as hereinbefore stated being air, having a temperature of the room where the roasting takes place, drawn down through the mass of beans by a suitable suction and exhausted through a suitable outlet.

At the time of completion of the roasting operation in every pound of coffee, there is approximately half a cup of delicate oil which is volatile. This oil carries the full flavor and aroma of the coffee bean. It, therefore, can be seen that it is vitally important to save this volatile oil which is constantly evaporating while the roasted coffee is in its heated state. Even at normal room temperatures this evaporation is constantly going on, but to a lesser degree.

Due to the present inadequate means and method employed for cooling the coffee beans immediately after being roasted, considerable of this volatile oil which has the characteristic coffee aroma and flavor is lost. By quick-chilling or quick-cooling the coffee beans immediately after they come out of the roaster, dissipation of this flavor-making and fragrance-giving volatile oil can be prevented.

It is the general purpose of this invention to provide method of and means for, quick-chilling or quick-cooling food materials which require roasting in order to bring out their respective flavors, the said quick-chilling or quick-cooling being accomplished immediately after the roasting operation and while the food materials are still in a hot state; and also to provide means for retaining the said food materials in a chilled state.

A more specific object of this invention is to introduce into the present day means of preparing the coffee beans for use, method of and means for quick-chilling or quick-cooling the hot coffee beans after they leave the roaster to prevent the escape of the volatile oil and for retaining the same in a cooled or chilled state within the hopper.

Further objects of the invention are in providing a method or process of and apparatus for chilling or cooling the coffee beans after they are taken out of the roaster, in considerable less time than that heretofore required, and means for retaining the chilled or cooled coffee beans in substantially the same chilled or cooled state.

As one desirable manner in carrying out my invention, I employ refrigerating or chilling means for use immediately after the roasting operation, the said means being preferably disposed immediately over the cooler box containing the hot coffee beans so that instead of drawing room temperature air through the cooler box, I employ the said means to chill the air prior to being drawn therethrough.

After the coffee beans have been thus quick-chilled they are pulled up the usual pipe or riser of the stoner apparatus into a hopper. In order that the coffee beans may be retained in their chilled state I provide the riser and hopper with suitable insulating means.

It is now known that coffee is a fresh food which when stale becomes rancid and toxic. Being perishable at normal temperatures, it should be kept in substantially the same chilled state as that within the hopper, until used. The coffee should, therefore, be transported from the hopper under refrigerated conditions similar to that required in the transportation of other perishable foods.

It is understood that the means employed to carry out the invention may be applied to the present type or types of roasting plants.

I will now, for purposes of illustration, proceed to describe the manner in which the method and practice, of my invention may be carried out in preparing the coffee beans for use, the steps of the method and apparatus being illustrated in the accompanying drawing, in which:

Fig. 1 is a diagrammatic top view showing a typical arrangement of parts employing the invention.

Fig. 2 is a diagrammatic side elevation partially in section of the same, showing the cooler box (in full lines) disposed under the refrigerating unit, and in dash lines disposed in front of the roaster.

Fig. 3 is a modification showing coffee beans sliding over a series of inclined chilled baffle plates onto a conveyor belt.

In the drawing the numeral 11 indicates the front portion of a roaster of the usual type for roasting coffee beans and provided with a spout or shute 12. The cooler box 13 which may be of the usual type is open at its top and is provided with a perforated false or secondary bottom 14, the perforations of which are smaller than the size of the coffee beans.

After the coffee beans are roasted to the desired degree, which is usually indicated by the color assumed by the beans, they are dumped in their heated state from roaster 11 through shute 12 into cooler box 13. Attached to a suitable opening formed in the side or bottom of the cooler box and below the perforated secondary bottom 14 is a flexible hose 15 which leads to an air pump or suction fan (not shown). Ordinarily, to cool the hot beans in the cooler box 13, a powerful air suction is applied by means of the pump or fan which draws air at room temperature through the mass of beans and exhausts it through a suitable outlet (not shown) usually arranged in the roof or in a side of the building. This cooling operation usually takes approximately from eight to nine minutes, but at the end of that time the beans are still quite warm.

In order to quick-chill or quick-cool the coffee beans immediately after they are dumped into the cooler box to prevent uneven development and scorching thereof and in order to prevent evaporation of the volatile oil from the hot coffee beans, I employ any suitable type of refrigerating or refrigerative device, the type of refrigerating unit indicated in the drawing by the numeral 16 having the coils 17 arranged within a box-like container 18 suitably insulated and an air inlet 19 located preferably at the top thereof. Only part of the refrigerating device is shown, the pipe connections 9 and 10 connecting the unit 16 with the operating plant (not shown), the arrows adjacent the pipes indicating the direction of flow of the refrigerant. The container 18 is supported on walls 21 or the like, and raised a sufficient distance from the floor to allow the cooler box 13, when conveyed through the instrumentality of its wheels 22 along the tracks 23, to be positioned underneath the container 18, the sleeve 40 being adapted to slide over the sides of the cooler box as shown in Figure 2.

When the cooler box is placed in the latter position and the air suction device and refrigerating plant are in operation, air at room temperature is drawn down through the inlet 19 into the container 18 where it is cooled or chilled. The cooled or chilled air is drawn through the open bottom of the container and down through the mass of hot coffee beans in the cooler box whereby the beans become quick-cooled or quick-chilled, and is exhausted through the outlet.

The container 18 should be placed as close to the roaster 11 as may be convenient so that quick-cooling or quick-chilling step may be accomplished as soon after completion of the roasting step.

To apply this suction instantly when a batch of coffee beans leaves the roaster, receptacle 18 may be connected at its bottom with a suitably insulated flexible or jointed and telescoped pipe (not shown) which follows the cooler box as it is pushed up to the roaster, the flexible pipe 15 being long enough to permit this movement of the cooler box. In this case the sleeve 40 may be dispensed with.

After the coffee beans have been quick-cooled or quick-chilled, the cooler box is then moved over to a position under the bottom of pipe or stoner riser 24 having a sliding sleeve 25 reaching into the cooler box. Through pipe 24 is drawn (by means not shown) a carefully regulated draft air, the draft being so adjusted by suitable means (not shown) that it is just strong enough to pull the coffee beans up the pipe but leaves behind any material that may be heavier.

The top of pipe or stoner riser 24 is connected to a large hopper 26 into which the beans fall and from this hopper the beans may be distributed by gravity through the outlet 27 into containers 28. The hopper is suitably insulated as shown at 29 in order that the beans may be retained in their chilled state. The pipe 24 may also be suitably insulated to prevent the heat in the room being conducted to the beans. It is understood that the degree of chilliness of the container 18 may be controlled at the refrigerating plant in the usual way.

In the arrangement shown in Figure 3, the roaster 11' is provided with a shute 12' its opening registering with an opening 30 in floor 31. Below floor 31 and underneath the roaster 11' is disposed the insulated receptacle 18' containing the coils 17' arranged under the inclined baffles 32, the latter being attached to receptacle 18' which functions as the cooler box. The coils are connected to the operating means of the refrigerating unit (not shown) through the pipes 9', 10', cut-off valves 33 being interposed in the lines.

The roasted coffee beans upon leaving the roaster 11' are immediately dumped on the top baffle 32. The baffles being inclined, the beans by gravity slide or move therealong and during this movement become cooled or chilled. From the bottom baffle the beans dump onto the conveyor belt 34 to be conveyed to the stoner apparatus. The opening 30 also provides a vent for the escape of the hot gases which would naturally be driven off from the hot beans when coming in contact with the baffles and also for the hot air within the receptacle 18'.

As heretofore stated the present method of preparing the coffee beans for use comprises substantially three steps, that is, roasting, then cooling by air at normal temperature, and then depositing the beans into a hopper. My invention comprises the interposition of refrigerating means whereby the coffee beans are chilled immediately after the beans leave the roaster, that is, while they are still in a hot state, and also providing an insulated hopper to substantially maintain the beans which are deposited therein in the same chilled state.

The quick-chilled beans produced in accordance with my invention may be transported from the hopper under refrigerated conditions similar to that used in the transportation of perishable foods.

It is understood that the terms which have been employed herein are used in a descriptive rather than in a limiting sense.

In the accompanying drawing, I have illustrated apparatus to carry out the method of my invention but as this illustration is primarily for purposes of disclosure it will be understood that the invention is not limited to this particular form of structure and that it may be modified in many respects without departure from the true spirit and scope of the invention as herein defined and claimed.

Having thus described my invention, what I claim as new and desire to secure by Letters Patent, is:

1. In a coffee roasting apparatus having a cooler box provided with an outlet; a refrigerator adapted to accommodate said cooler box therein, and means to pass air through the refrigerator and the box.

2. In a coffee bean roasting apparatus having a cooler box for the heated beans, a refrigerator adapted to accommodate said cooler box thereunder, and means to pass air through the refrigerator and then through the box to suddenly chill the beans therein.

JOSEPH SCHULMAN.